(12) United States Patent
Miller

(10) Patent No.: US 7,433,174 B2
(45) Date of Patent: Oct. 7, 2008

(54) METHOD OF MAKING, APPARATUS, AND ARTICLE OF MANUFACTURING FOR AN ELECTRODE TERMINATION CONTACT INTERFACE

(75) Inventor: John Miller, Cedar, MI (US)

(73) Assignee: Maxwell Technologies, Inc., San Diego, CA (US)

( * ) Notice: Subject to any disclaimer, the term of this patent is extended or adjusted under 35 U.S.C. 154(b) by 259 days.

(21) Appl. No.: 11/483,253

(22) Filed: Jul. 6, 2006

(65) Prior Publication Data

US 2008/0007892 A1 Jan. 10, 2008

(51) Int. Cl.
*H01G 9/00* (2006.01)

(52) U.S. Cl. ............... 361/502; 361/503; 29/25.03
(58) Field of Classification Search ........ 361/502, 361/503; 29/25.03
See application file for complete search history.

(56) References Cited

U.S. PATENT DOCUMENTS

| 6,137,673 | A  | * | 10/2000 | Andou et al. | ........... 361/502 |
| 6,430,031 | B1 | * | 8/2002  | Dispennette et al. | ...... 361/502 |
| 6,451,073 | B1 | * | 9/2002  | Farahmandi et al. | ...... 29/25.03 |
| 2005/0081350 | A1 | * | 4/2005 | Kurihara et al. | ......... 29/25.03 |
| 2005/0231892 | A1 | * | 10/2005 | Harvey | ................. 361/502 |
| 2007/0195487 | A1 | * | 8/2007 | James et al. | ............ 361/502 |
| 2007/0201186 | A1 | * | 8/2007 | Norton et al. | ............ 361/502 |
| 2008/0013254 | A1 | * | 1/2008 | Miller | ................... 361/502 |
| 2008/0089012 | A1 | * | 4/2008 | Kon et al. | ............... 361/502 |

\* cited by examiner

*Primary Examiner*—Eric Thomas
(74) *Attorney, Agent, or Firm*—Hensley Kim & Holzer, LLC

(57) ABSTRACT

An electrode termination contact interface, adapted for use in an energy storage device, is disclosed. The disclosed apparatus and article of manufacture function to lower equivalent series resistance of the electrode termination contact interface for energy storage devices, such as for example a capacitor device or a battery device. In one embodiment of the present teachings, an ultracapacitor electrode termination contact interface, adapted to increase reliability and manufacturing yield of such devices is disclosed.

20 Claims, 13 Drawing Sheets

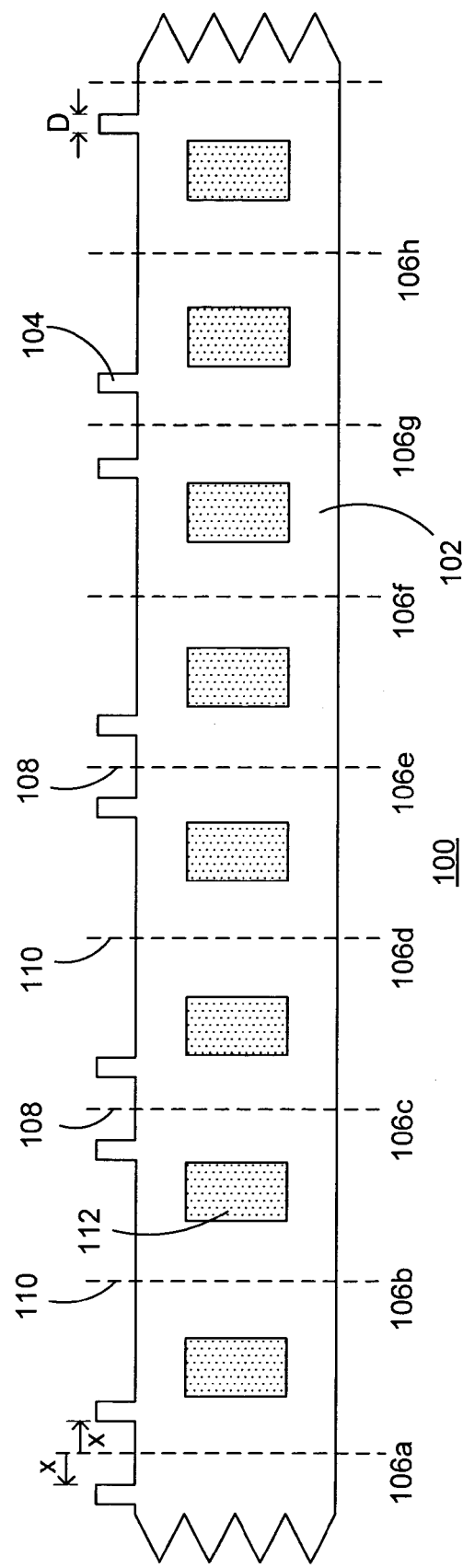
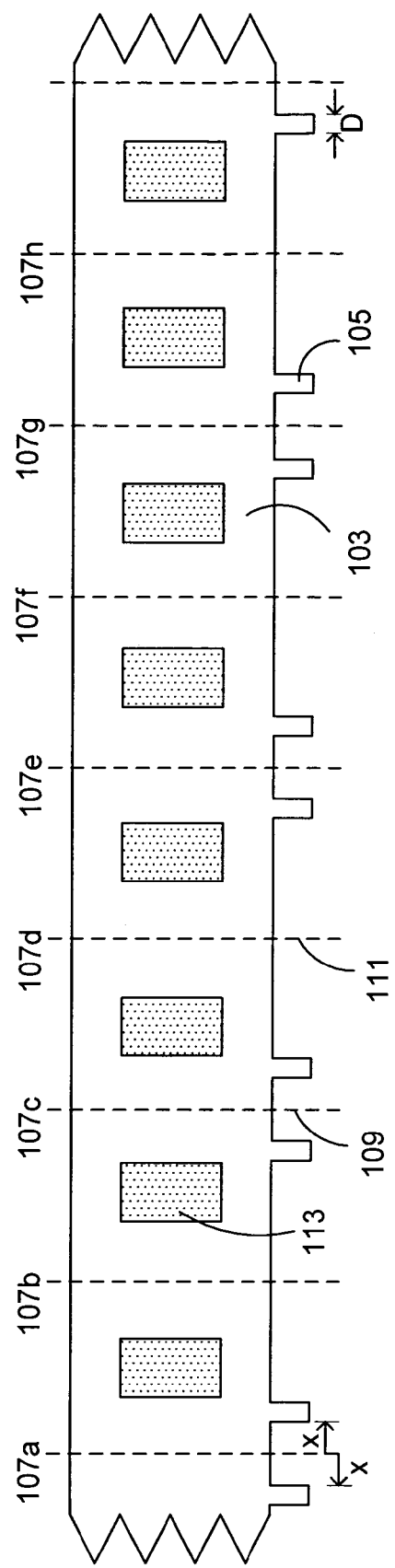

110

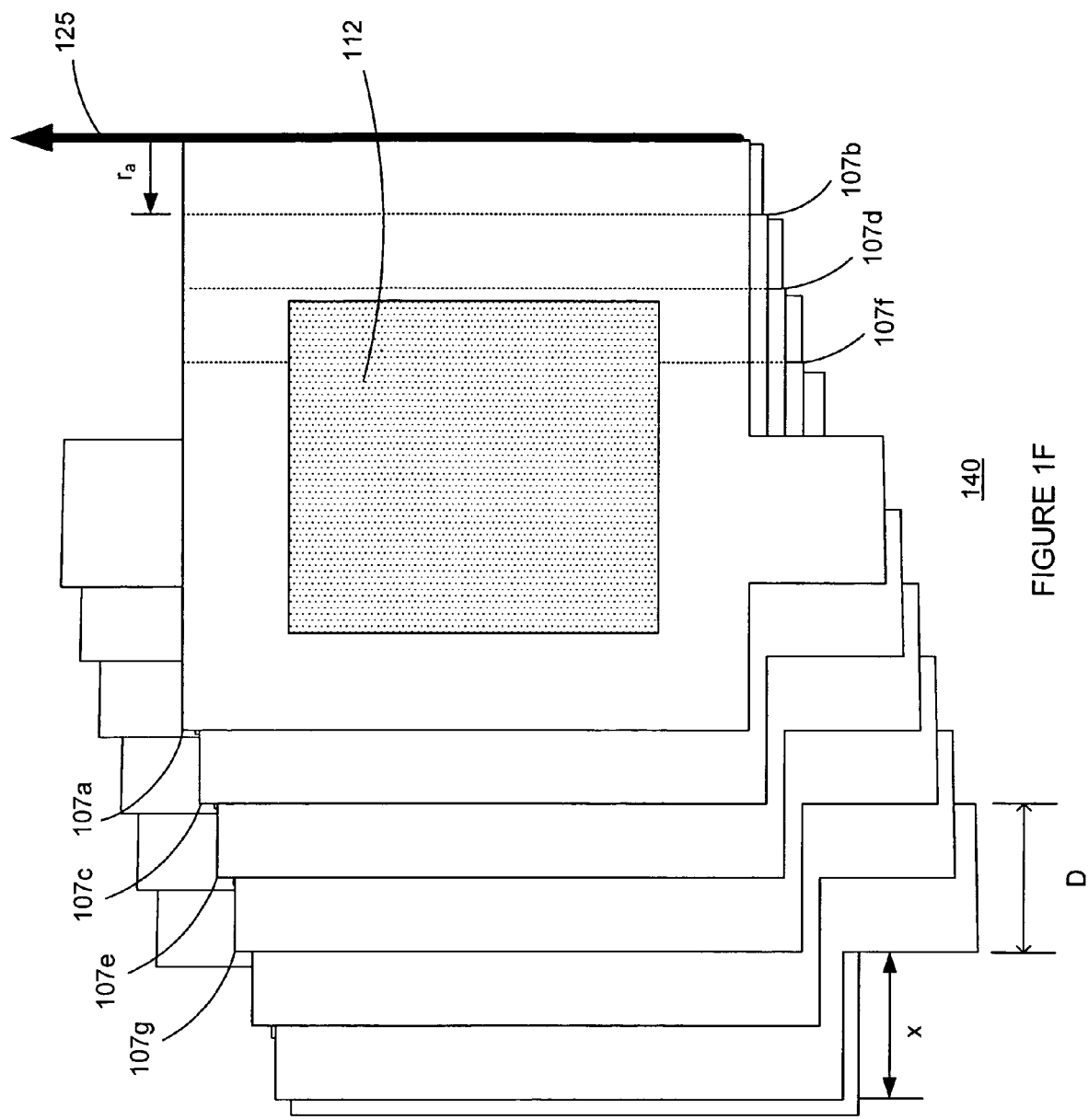

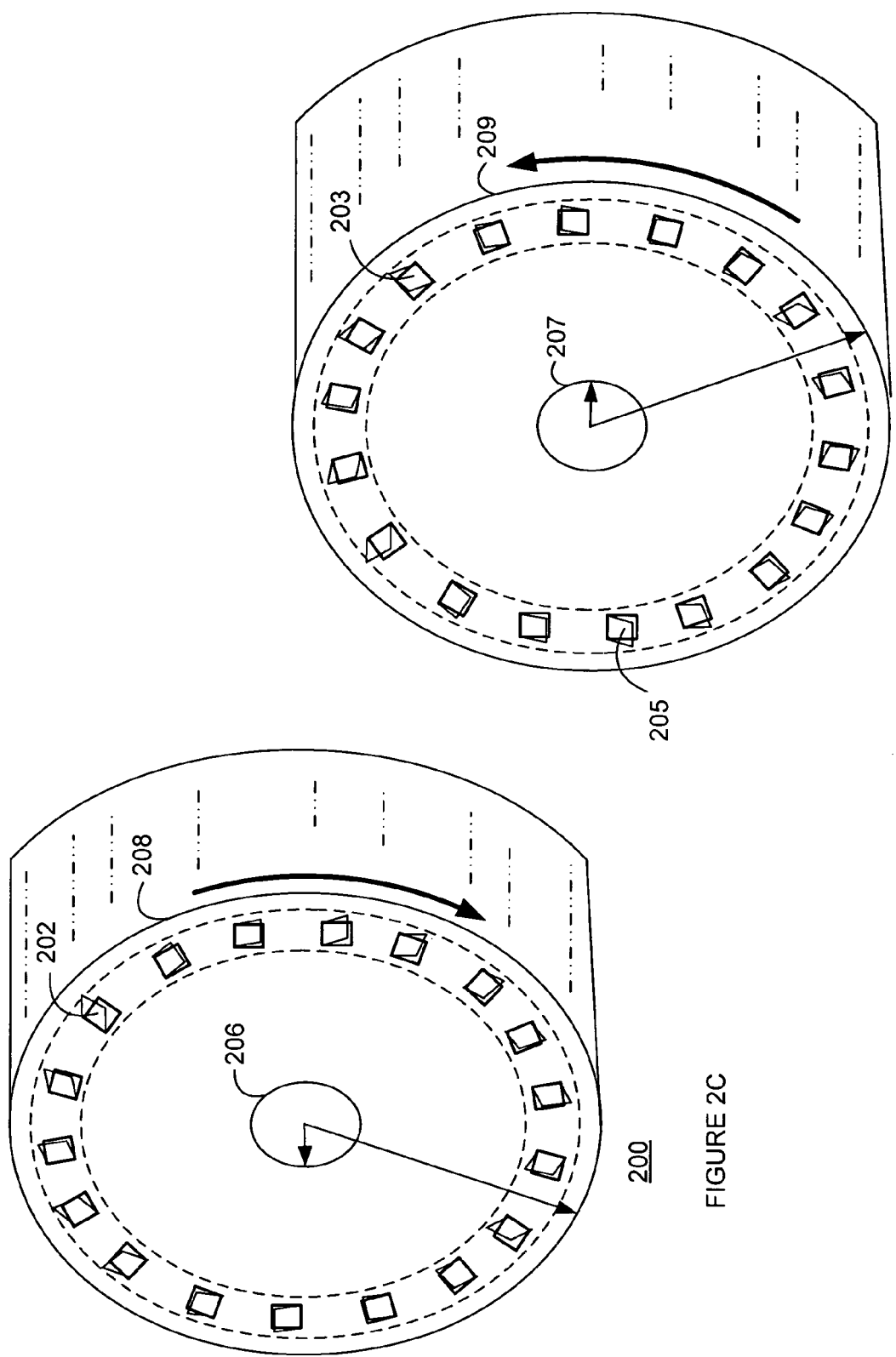

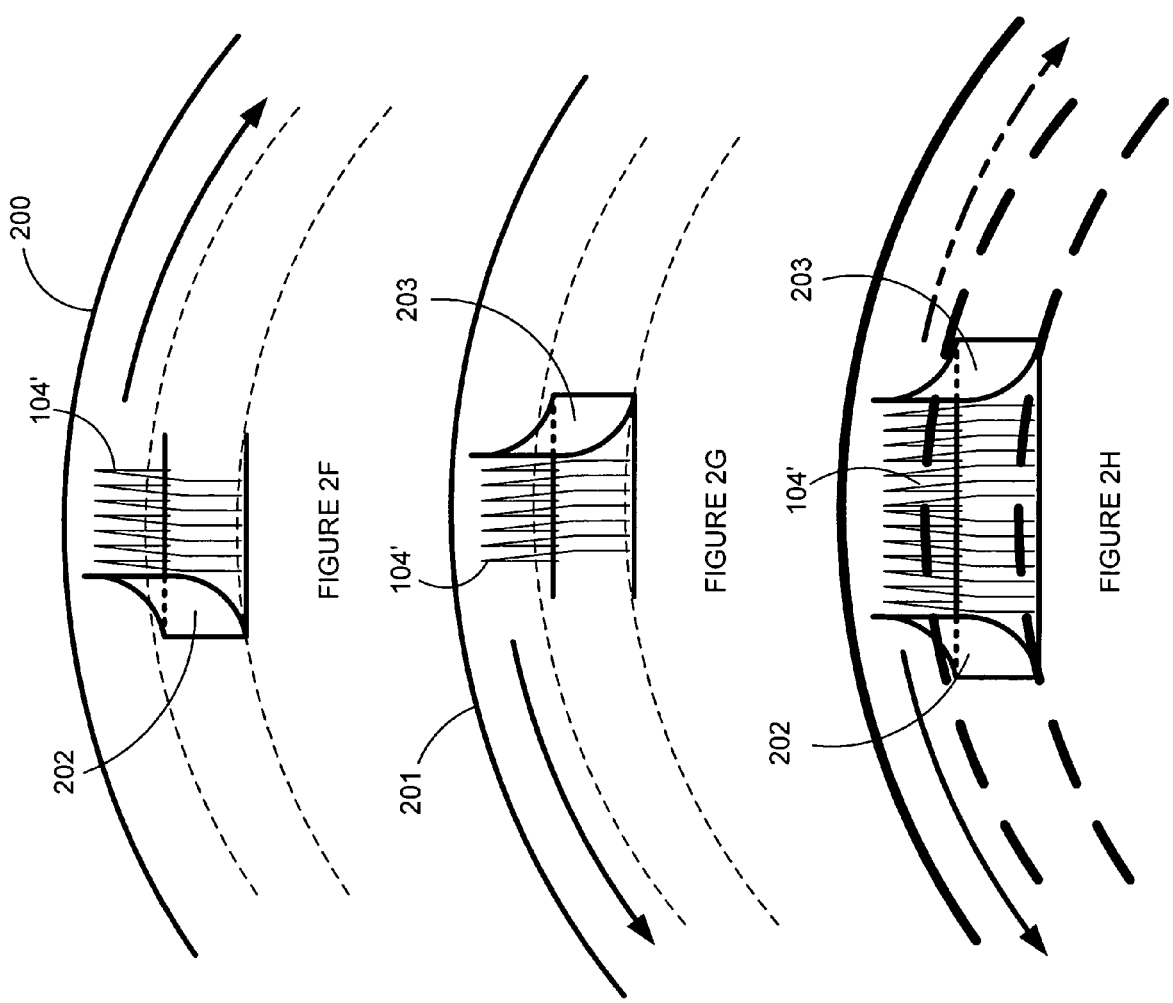

METHOD OF MAKING, APPARATUS, AND ARTICLE OF MANUFACTURING FOR AN ELECTRODE TERMINATION CONTACT INTERFACE

BACKGROUND

1. Field

The disclosed method of making, apparatus, and article of manufacture relates generally to high performance energy storage devices, and particularly to increasing electrode interface efficiency and lowering equivalent series resistance of such interfaces.

2. Related Art

Double layer capacitors, also referred to as electrochemical double layer capacitors, are energy storage devices that are able to store more energy per unit weight and unit volume than traditional capacitors. Additionally, they can typically deliver the stored energy at a higher power rating than rechargeable batteries.

Double layer capacitors consist of two porous electrodes that are isolated from electrical contact by a porous separator. Both the separator and the electrodes are impregnated with an electrolytic solution. This allows ionic current to flow between the electrodes through the separator at the same time that the separator prevents an electrical or electronic (as opposed to ionic) current from shorting the cell. Coupled to the back of each of the active electrodes is a current collecting element. One purpose of the current collecting element is to reduce ohmic losses in the double layer capacitor.

Specifically, improvements are needed in the techniques and methods for fabricating double layer capacitor electrodes so as to lower electrode resistance of the double layer capacitor and maximize the operating voltage. For example, the method used to connect the current collector element of the capacitor to the electrode is important because the interface between the electrode and the current collector element is a source of internal resistance of the double layer capacitor. Since capacitor energy density increases with the square of the operating voltage, higher operating voltages thus translate directly into significantly higher energy densities and, as a result, higher power output ratings. Equation 1 shows a mathematical expression for energy stored in a capacitor, wherein energy is measured in joules. Equation 2 below shows a mathematical equation for average power output of a capacitor in watts. It is apparent that improved techniques and methods are needed to lower the internal resistance of the electrodes used within a double layer capacitor and increase the operating voltage.

$$E = CV^2/2 \quad \text{Equation 1:}$$

$$P_{av} = CV^2/2t \quad \text{Equation 2:}$$

There is a continuing need for improved double layer capacitor design. Such improved double layer capacitors need to deliver large amounts of useful energy at a very high power output and energy density ratings within a relatively short period of time. Such improved double layer capacitors should also have a relatively low electrode interface equivalent series resistance (ESR) and yet be capable of yielding a relatively high operating voltage.

An ESR rating for a capacitor is a rating of quality. A theoretically perfect capacitor would have an ESR of zero. Ideal capacitors therefore have exactly 90 degree phase shift of voltage with respect to current which implies zero dissipation factor ("DF"). However, all real capacitors have some amount of ESR. Hence, a real-world challenge for capacitor designers is minimizing ESR. ESR is modeled like a resistor in series with a capacitor. Capacitor designs that appear optimally functional in theory, can fail when manufactured due to ESR. Increasingly, modern electronic designs rely on low ESR capacitors to function optimally in a real-world environment. Low ESR means low charge and discharge time constant which is very important in applications that require high power to energy ratios, such as hybrid electric vehicles, electric power assist steering, brake system support, and most industrial applications.

An interface point of termination from a capacitor electrode foil to an end cap, such as a terminal cap, is an issue in assembly and manufacturing. Modern laser welding techniques, for example, may only fuse 15%-40% of the available foil wraps inside a double layer capacitor, leading to part to part manufacturing variability in ESR, as well as loss of integrity with age.

Therefore, a need exists to improve consistency of manufacturing variability, and therefore improve manufacturing yield, as well as improve reliability of an energy storage device, such as for example a double layer capacitor, as it ages. The present teachings provide a method for making an electrode termination interface for solving the aforementioned problems and issues by providing a highly reliable, low cost, solution to improve electrode termination interface ESR, which is more efficient than prior art solutions.

SUMMARY

In one embodiment of the present teachings, a method of making an electrode termination contact interface to a terminal cap is disclosed. The method of making comprises the steps of forming a first electrode foil having a plurality of active carbon deposits disposed upon predetermined portions of the first electrode foil, the electrode foil further having a plurality of current collecting tab portions disposed thereon; defining a plurality of fold zones thereupon the first electrode foil, wherein the fold zones are bounded by a plurality of fold lines; folding the first electrode foil symmetrically about alternating fold lines; defining a plurality of fold zone outer radius folds, wherein the plurality of fold zone outer radius folds all lie at a fixed position relative to a winding center axis; interposing at least one separator sheet between the plurality of fold zones, wherein the at least one separator sheet electrically isolate the plurality of fold zones; defining a plurality of fold zone inner radius folds, wherein the plurality of fold zone inner radius folds are linearly spaced toward an annular core, and collecting the plurality of current collecting tab portions for each of the plurality of fold zones into a first plurality of gatherings.

In one another embodiment of the present teachings, an electrode structure is disclosed. The electrode structure comprises a first electrode foil having a plurality of active carbon deposits disposed upon predetermined portions of the first electrode foil, the electrode foil further having a plurality of current collecting tab portions disposed thereon; a plurality of fold zones thereupon the first electrode foil, wherein the fold zones are bounded by a plurality of fold lines; a plurality of fold zone outer radius folds, wherein the plurality of fold zone outer radius folds all lie at a fixed position relative to a winding center axis; at least one separator sheet between the plurality of fold zones, wherein the at least one separator sheet electrically isolate the plurality of fold zones, and; a plurality of fold zone inner radius folds, wherein the plurality of fold zone inner radius folds are linearly spaced toward an annular core.

In another embodiment of the present teachings, an article of manufacture comprising an electrode termination contact interface and a terminal cap assembly is disclosed. The article of manufacture comprises a first electrode foil having current collecting tab portions oriented in a first direction; a separator; a second electrode foil having current collecting tab portions oriented in a second direction; a first terminal cap, comprising a plurality of terminal cap opening tabs, wherein the plurality of terminal cap opening tabs open in a first direction; a threading disposed circumferentially about the first terminal cap, wherein the threading is wound in a first orientation; a second terminal cap, comprising a plurality of terminal cap opening tabs, wherein the plurality of terminal cap opening tabs open in a second direction, and a threading disposed circumferentially about the first terminal cap, wherein the threading is wound in a second orientation, wherein the second orientation is approximately opposite from the first orientation.

BRIEF DESCRIPTION OF THE DRAWINGS

Embodiments of the disclosed method and apparatus will be more readily understood by reference to the following figures, in which like reference numbers and designations indicate like elements.

FIG. 1A illustrates a front plan view of an unfolded electrode termination foil showing current collecting tab portions oriented in a positive vertical direction.

FIG. 1B illustrates a front plan view of an unfolded electrode termination foil showing current collecting tab portions oriented in a negative vertical direction.

FIG. 1F illustrates a perspective view of the folded electrode termination foil of FIG. 1C folded together with the folded electrode termination foil of FIG. 1D, having the separator of FIG. 1E therebetween.

FIG. 2C illustrates a perspective view of the first terminal cap of FIG. 2A.

FIG. 2D illustrates a perspective view of the second terminal cap of FIG. 2B.

FIG. 2F illustrates a perspective view of a portion of the first terminal cap fitted onto the current collecting tab portions of FIG. 1C.

FIG. 2G illustrates a perspective view of a portion of the second terminal cap fitted onto the current collecting tab portions of FIG. 1C.

FIG. 2H illustrates a perspective view of a portion of the first terminal cap and the second terminal cap fitted together onto the current collecting tab portions of FIG. 1C.

FIG. 2I illustrates an exploded view of an assembly of the first terminal cap and the second terminal cap fitted together onto an electrode termination contact interface.

DETAILED DESCRIPTION

Figure 1C:
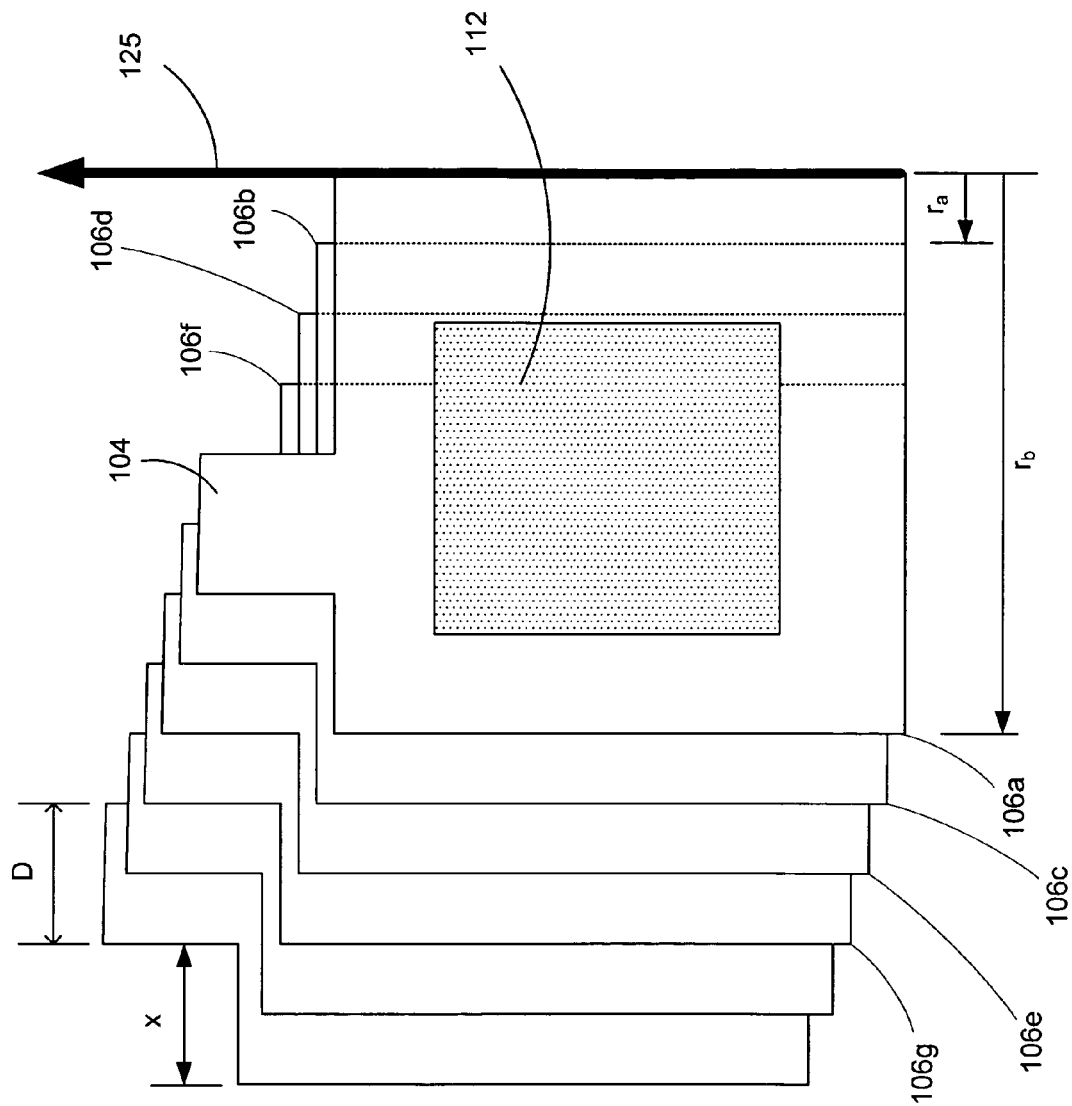
FIG. 1C illustrates a perspective view of a folded electrode termination foil showing current collecting tab portions oriented in a positive vertical direction.

FIG. 1A illustrates a front plan view of an unfolded electrode termination foil 100 showing a plurality of current collecting tab portions 104 oriented in a positive vertical direction. In one illustrative exemplary embodiment the unfolded electrode termination foil 100 of the present teachings comprises a first electrode foil 102, a plurality of active carbon deposits 112, the plurality of current collecting tab portions 104, and a plurality of fold zones bounded by fold lines 106a-h. The fold lines 106a-h comprise a plurality of fold lines including a plurality of fold zone inner radius folds 110 and further bounded by a plurality of fold zone outer radius folds 108. The plurality of current collecting tab portions 104 have a tab width of "D", as shown in FIG. 1A. A distance "x" measured laterally away from each of the plurality of fold zone outer radius folds 108 marks a position for each of the plurality of current collecting tab portions 104. Using the techniques described herein, an implementation of employing the plurality of current collecting tab portions 104, wherein the tab portions 104 are symmetrically located about electrode foil lines, leads to a current collector contact for each of the plurality of active carbon deposits 112 on the first electrode foil. The disclosed technique ensures that each of the plurality of active carbon deposits 112 has a current collecting tab associated therewith. This will ensure high quality terminations and tighter tolerance for ESR.

FIG. 1B a front plan view of an unfolded electrode termination foil 101 showing a plurality of current collecting tab portions 105 oriented in a negative vertical direction. In one illustrative exemplary embodiment the unfolded electrode termination foil 101 of the present teachings comprises a first electrode foil 103, a plurality of active carbon deposits 113, the plurality of current collecting tab portions 105, and a plurality of fold zones bounded by fold lines 107a-h. The fold lines 107a-h comprise a plurality of fold lines including a plurality of fold zone inner radius folds 111 and further bounded by a plurality of fold zone outer radius folds 109. The plurality of current collecting tab portions 105 have a tab width of "D", as shown in FIG. 1B. A distance "x" measured laterally away from each of the plurality of fold zone outer radius folds 109 marks a position for each of the plurality of current collecting tab portions 105.

FIG. 1C illustrates a perspective view of a folded electrode termination foil 120 showing the plurality of current collecting tab portions 104 oriented in a positive vertical direction, corresponding to the unfolded electrode termination foil 100 of FIG. 1A. The folded electrode termination foil 120 of FIG. 1C is a view of how FIG. 1A looks when the unfolded electrode termination foil 100 is folded along the fold lines 106a-g. In one embodiment, the fold lines 106a, 106c, 106e, and 106g comprise outer radius fold lines, lying at a fixed outer radial position ("$r_b$") relative to a winding center axis 125, which defines one boundary of the plurality of fold zones. The fold lines 106b, 106d, and 106f comprise inner radius fold lines, bounding the fold zones on another side, which are linearly spaced (at a distance "$r_a$") toward an annular core of the wound volume, which will be described further below.

Figure 1D:
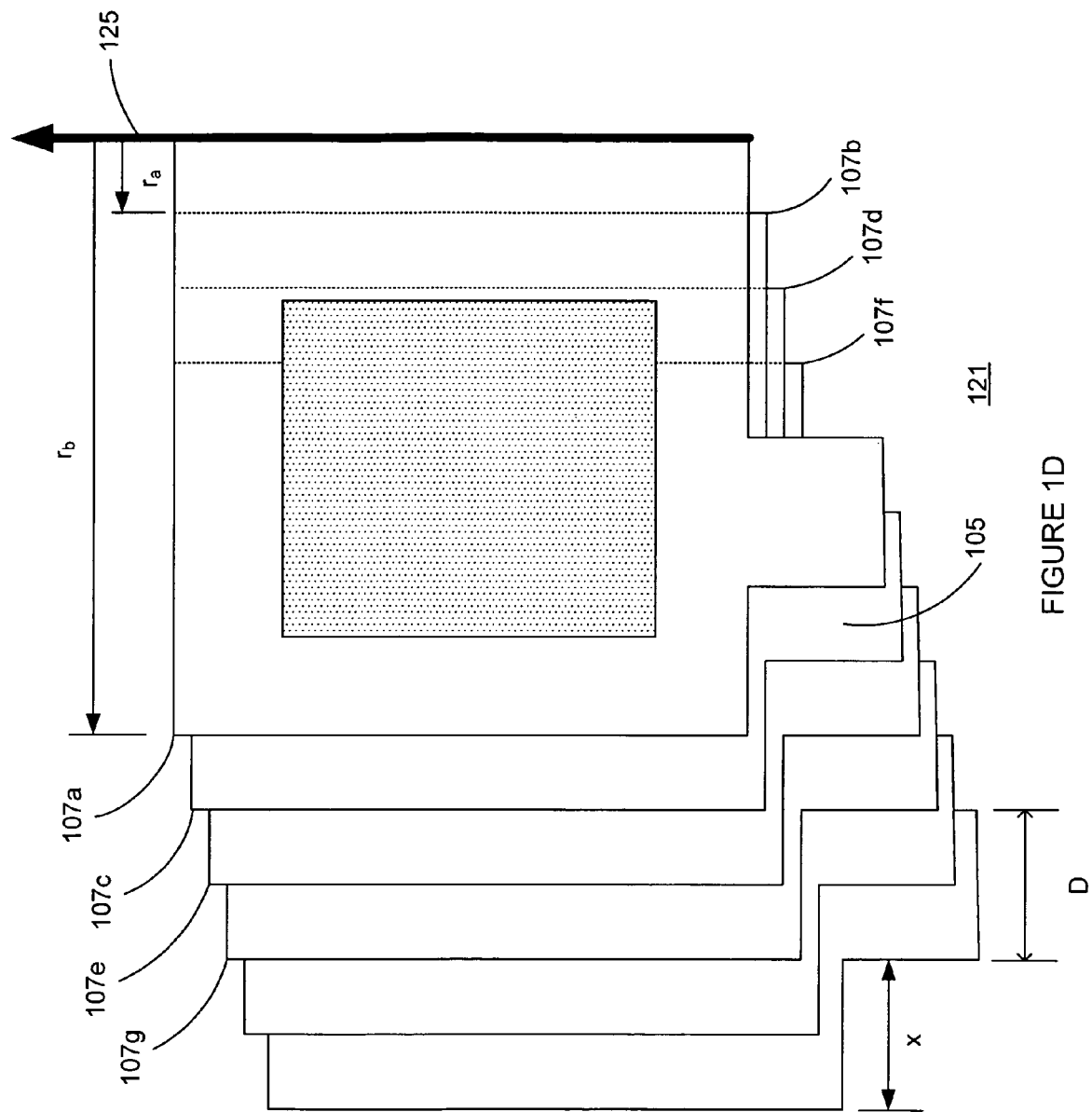
FIG. 1D illustrates a perspective view of a folded electrode termination foil showing current collecting tab portions oriented in a negative vertical direction.

FIG. 1D illustrates a perspective view of a folded electrode termination foil 121 showing current collecting tab portions 105 oriented in a negative vertical direction, corresponding to the unfolded electrode termination foil 101 of FIG. 1B. The folded electrode termination foil 121 of FIG. 1D is a view of how FIG. 1B looks when the unfolded electrode termination foil 101 is folded along the fold lines 107*a-g*. In one embodiment, the fold lines 107*a*, 107*c*, 107*e*, and 107*g* comprise outer radius fold lines, lying at a fixed outer radial position ("$r_b$") relative to a winding center axis 125, which defines one boundary of the plurality of fold zones. The fold lines 107*b*, 107*d*, and 107*f* comprise inner radius fold lines, bounding the fold zones on another side, which are linearly spaced (at a distance "$r_a$") toward an annular core of the wound volume, which will be described further below.

Figure 1E:
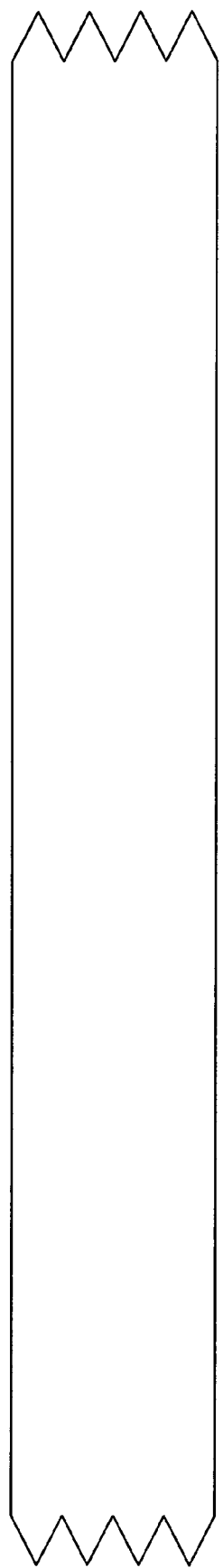
FIG. 1E illustrates a front plan view of a separator.

FIG. 1E illustrates a front plan view of a separator 110. The separator 110 has dimensions of length and width approximately identical to the electrode termination foils described above. In the completed assembly of the electrode termination contact interface, the separator 110 is interposed between the first electrode foil 102 and the second electrode foil 103. The separator 110 functions to prevent foil 102 from electronic shorting to foil 103, while simultaneously allowing ionic current to flow therebetween. When the foil 102 and foil 103 are folded, the separator 110 is positioned therebetween, and prevents electronic shorting thereof.

FIG. 1F illustrates a perspective view of the folded electrode termination foil 120 of FIG. 1C folded together with the folded electrode termination foil 121 of FIG. 1D, having the separator 110 of FIG. 1E therebetween (not shown) to form a capacitor electrode termination contact interface 140, adapted for interfacing with a terminal cap. It will be appreciated that when fully assembled, the electrode termination contact interface forms an annular ring volume coaxial with the winding center axis 125, as will be described further below.

Figure 2A:
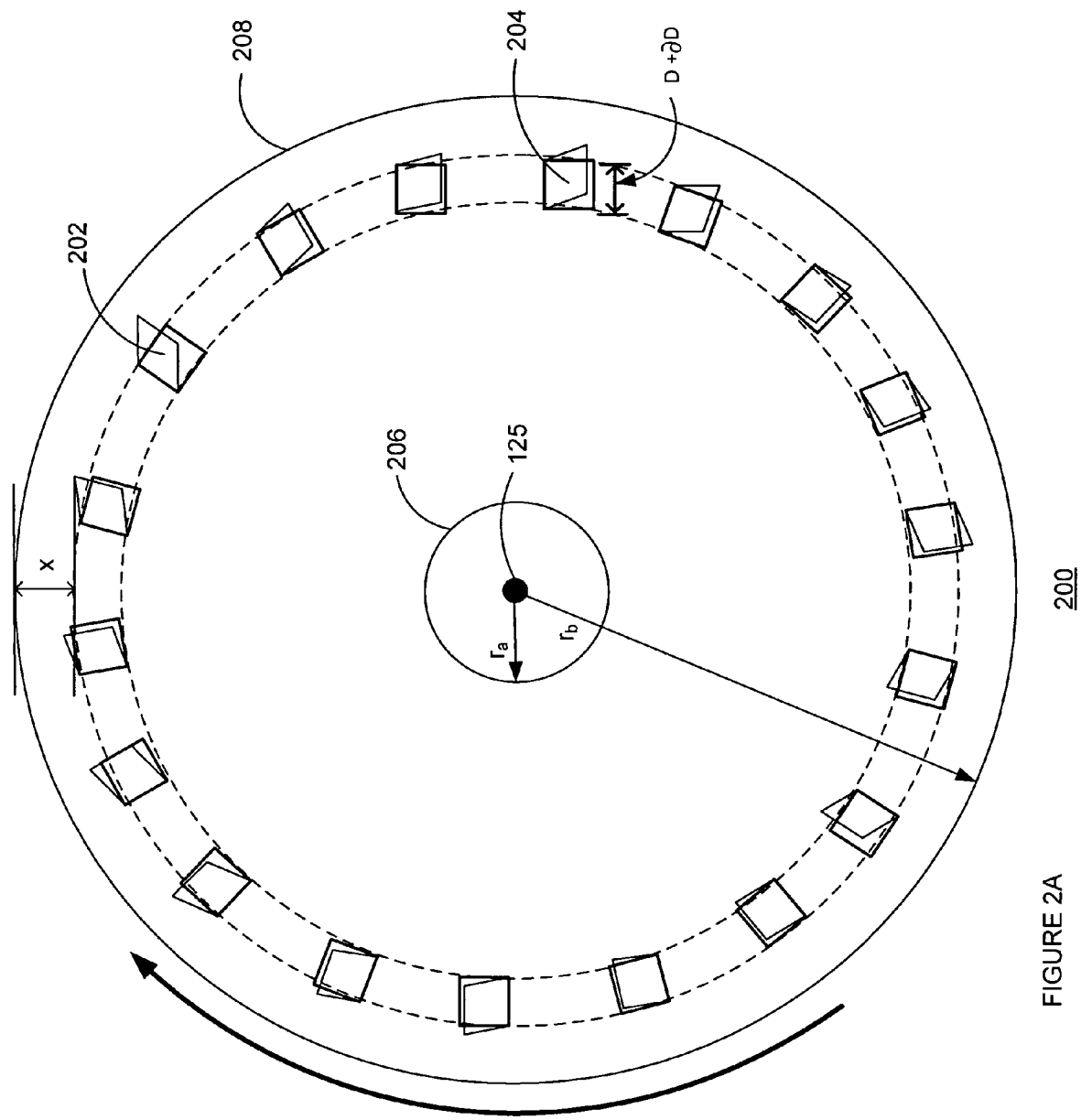
FIG. 2A illustrates a top plan view of a first terminal cap, showing a plurality of terminal cap opening tabs opening in a first direction.

FIG. 2A illustrates a top plan view of a first terminal cap 200, showing a plurality of terminal cap opening tabs 202 and 204 opening in a first direction. In one embodiment, the first terminal cap 200 is a conductive retention ring, wherein the plurality of terminal cap opening tabs 202 and 204 comprise three-sided punchings, each having the same radial displacement as the plurality of current collecting tab portions 104 and 105 (not shown in FIG. 2A). FIG. 2A shows the winding center axis 125 oriented orthogonally outward with respect to the page. The plurality of terminal cap opening tabs 202 and 204 each have a flap opening upward, wherein all the opening tabs 202 and 204 open in a first direction, as shown in FIG. 2A. As will be described in more detail below, the plurality of current collecting tab portions 104 and 105 are adapted to be collected and secured into the first terminal cap 200 via the opening tabs 202 and 204, such as for example clamping the opening tabs 202 and 204 against the plurality of current collecting tab portions 104 and 105. An outer edge 208 of the first terminal cap 200 is at a distance $r_b$ radially outward from the winding center axis 125. The width of the three-sided punchings is shown at the opening tab 204 as D+∂D, where D is the width of the plurality of current collecting tab portions 104 and 105. Also, the width ∂D is a small distance set to ensure the plurality of current collecting tab portions 104 and 105 do not gather and jam upon insertion therethrough.

Figure 2B:
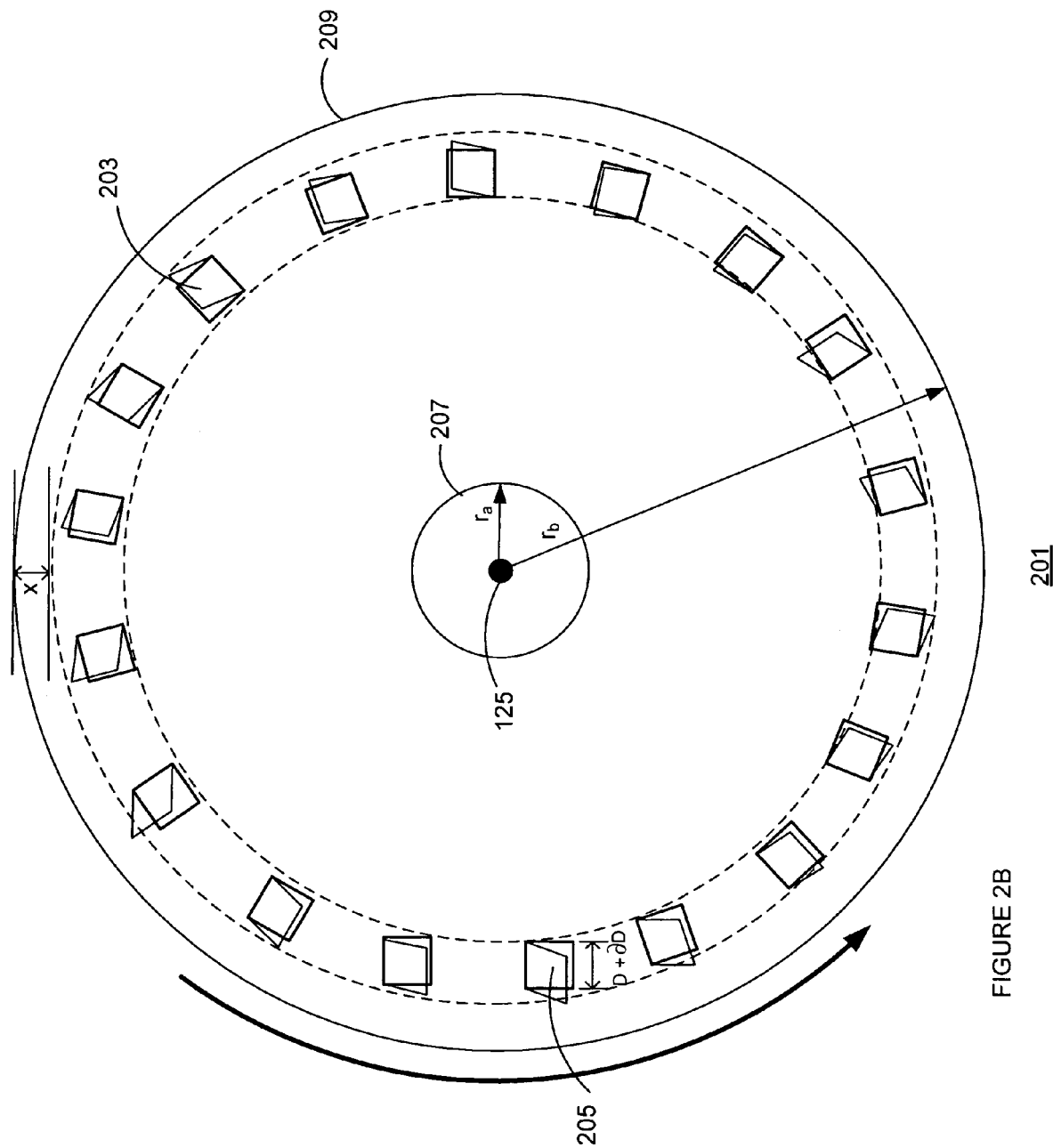
FIG. 2B illustrates a top plan view of a second terminal cap, showing a plurality of terminal cap opening tabs opening in a second direction.

FIG. 2B illustrates a top plan view of a second terminal cap 201, showing a plurality of terminal cap opening tabs 203 and 205 opening in a second direction. In one embodiment, the second terminal cap 201 is a conductive retention ring, wherein the plurality of terminal cap opening tabs 203 and 205 comprise three-sided punchings, each having the same radial displacement as the plurality of current collecting tab portions 104 and 105 (not shown in FIG. 2B). FIG. 2B shows the winding center axis 125 oriented orthogonally outward with respect to the page. The plurality of terminal cap opening tabs 203 and 205 each have a flap opening upward, wherein all the opening tabs 203 and 205 open in a second direction, as shown in FIG. 2B. As will be described in more detail below, the plurality of current collecting tab portions 104 and 105 are adapted to be collected and secured into the first terminal cap 201 via the opening tabs 203 and 205, such as for example clamping the opening tabs 203 and 205 against the plurality of current collecting tab portions 104 and 105. An outer edge 209 of the second terminal cap 201 is at a distance $r_b$ radially outward from the winding center axis 125. The width of the three-sided punchings is shown at the opening tab 205 as D+∂D, where D is the width of the plurality of current collecting tab portions 104 and 105. Also, the width ∂D is a small distance set to ensure the plurality of current collecting tab portions 104 and 105 do not gather and jam upon insertion therethrough.

FIG. 2C illustrates a perspective view of the first terminal cap 200 of FIG. 2A. Similarly, FIG. 2D illustrates a perspective view of the second terminal cap 201 of FIG. 2B. In one embodiment of the present disclosure, the first terminal cap 200 comprises a mechanical inner threading in approximately a circumferential orientation, about the inside of the first terminal cap 200 (not shown). In this embodiment, the second terminal cap 201 comprises a mechanical outer threading in approximately a circumferential orientation, about the outside of the second terminal cap 201 (not shown). In this embodiment, the second terminal cap 201 comprises a slightly smaller diameter than the first terminal cap 200, such that the first terminal cap 200 is threaded onto the second terminal cap 201. It will be appreciated that the relative positioning of the plurality of terminal cap opening tabs 203 and 205 are configured such that the plurality of current collecting tab portions 104 and 105 fit therethrough without jamming upon insertion.

Figure 2E:
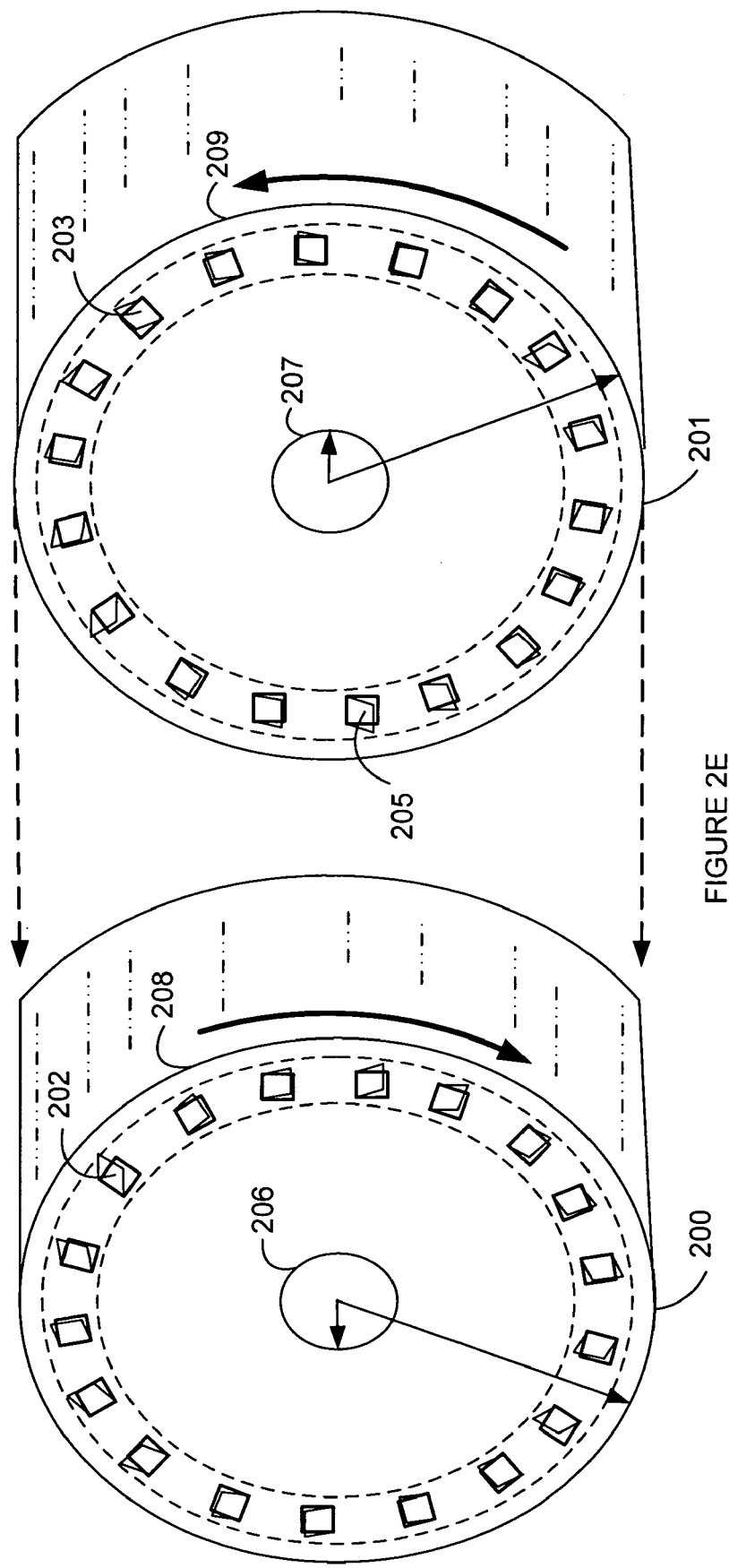
FIG. 2E illustrates a perspective view showing the first terminal cap of FIG. 2A fitting together with the second terminal cap of FIG. 2B.
Figure 21:
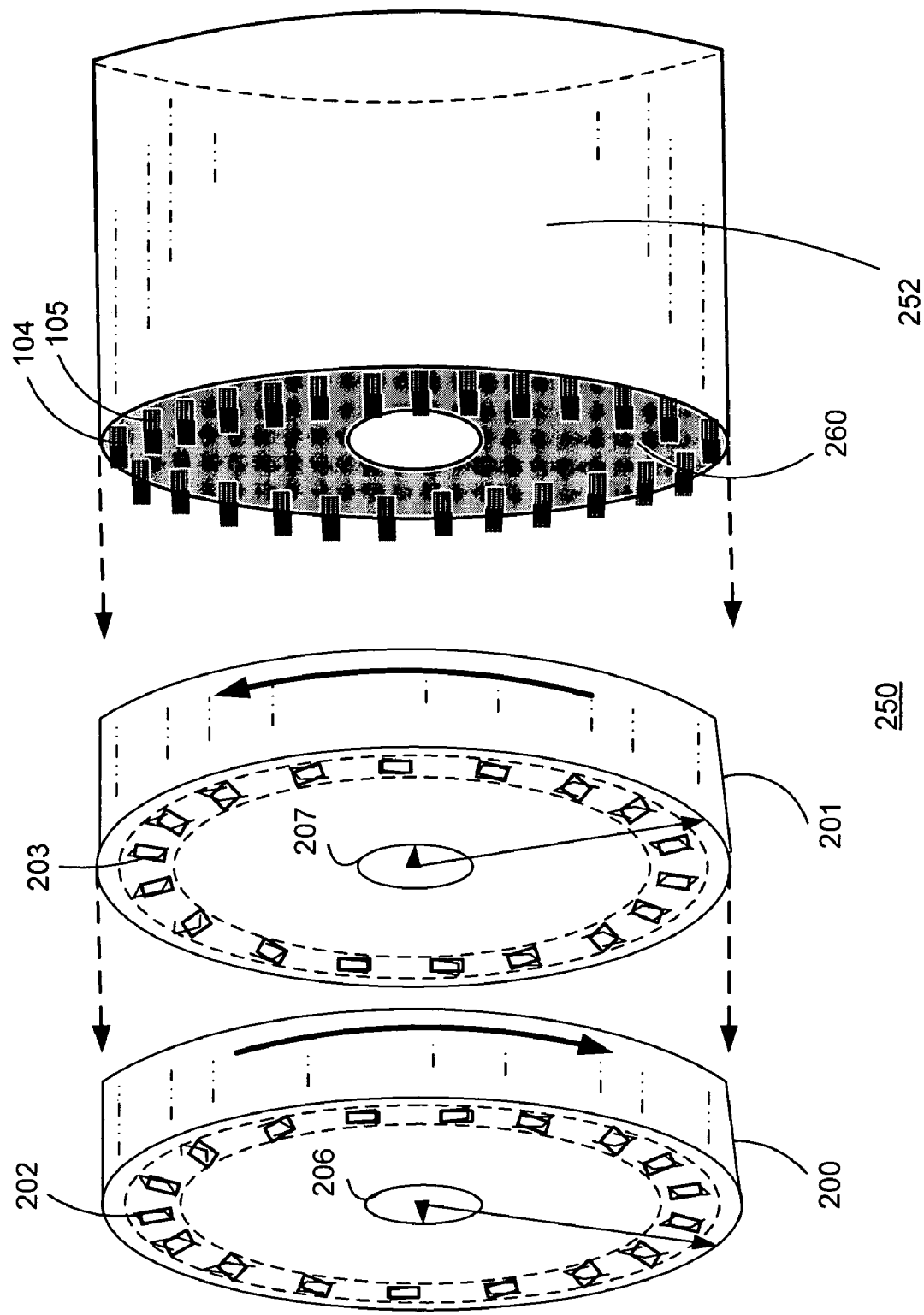

FIG. 2E illustrates a perspective view showing the first terminal cap 200 of FIG. 2A fitting together with the second terminal cap 201 of FIG. 2B. In one embodiment, the plurality of terminal cap opening tabs 202 and 203 are made in symmetrical pairs. In one variation of the embodiment, the first terminal cap 200 is a left hand ring (left threaded) that is disposed atop the electrode foils 120 and 121 (not shown) and is adapted to accept a large fraction of the plurality of current collecting tab portions 104 and 105 (not shown) therethrough. The second terminal cap 201 a right hand ring (right threaded) is adapted to fit atop the first terminal cap 200, such that when the threadings are tightened, the plurality of current collecting tab portions 104 and 105 are pinched together mechanically. In this manner, the pinched current collecting tab portions 104 and 105 and terminal caps 200 and 201 may be crimped, staked, welded, clinched, or otherwise affixed such that a high quality electrode termination contact interface is created.

FIG. 2F illustrates a perspective view of a portion of the first terminal cap 200 fitted onto the plurality of current collecting tab portions 104 of FIG. 1C. As shown in FIG. 2F, the plurality of current collecting tab portions 104 are collected into a plurality of gatherings 104'. The terminal cap opening tab 202 is shown applying mechanical pressure, in a first direction, against the plurality of gatherings 104', as the first terminal cap 200 is mechanically tightened.

FIG. 2G illustrates a perspective view of a portion of the second terminal cap 201 fitted onto the plurality of current collecting tab portions 104 of FIG. 1C. As shown in FIG. 2G, the plurality of current collecting tab portions 104 are pressed into a plurality of gatherings 104'. The terminal cap opening tab 203 is shown applying mechanical pressure, in a second direction, against the plurality of gatherings 104', as the second terminal cap 201 is mechanically tightened.

FIG. 2H illustrates a perspective view of a portion of the first terminal cap 200 and the second terminal cap 201 fitted together onto the plurality of current collecting tab portions 104 of FIG. 1C, wherein the terminal cap opening tab 203 of the terminal cap 201 fits therethrough the terminal cap opening tab 202 of the terminal cap 200. As shown in FIG. 2G, the current collecting tab portions 104 are collected into a plurality of gatherings 104'. The terminal cap opening tab 202 is shown applying mechanical pressure, in a first direction, against the plurality of gatherings 104', while the terminal cap opening tab 203 is shown applying mechanical pressure, in a second direction against the plurality of gatherings 104'. Moreover, as the terminal caps 200 and 201 are tightened against one another respectively via the threading described above, the mechanical force exerted by the tabs 202 and 203 against the plurality of gatherings 104' increases, therefore the electrical connectivity is proportionally increased thereby, as will be appreciated by those of skill in the art. The plurality of gatherings 104' are then crimped, clamped, or pinched and can then be laser welded, conductive adhesive bonded.

FIG. 2I illustrates an exploded view of an assembly 250 of the first terminal cap 200 and the second terminal cap 201 fitted together onto an electrode termination contact interface 260. In one embodiment, a first plurality of current collecting tab portions 104 have a directional orientation approximately identical to a second plurality of current collecting tab portions 105, with respect to the electrode termination contact interface 260, as shown in FIG. 2I. The plurality of current collecting tab portions 104 and 105 are adapted to fit through terminal cap opening tabs 203 of the terminal cap 201, and receive mechanical pressure therefrom, as described above with respect to FIG. 2F. Further, the plurality of current collecting tab portions 104 and 105 are further adapted to fit through the terminal cap opening tabs 202 of the terminal cap 200, and receive mechanical pressure therefrom, as described above with respect to FIG. 2G and FIG. 2H. In one embodiment, the terminal cap 201 is threaded such that the terminal cap 201 is adapted to be threaded onto a body 252 of the electrode termination contact interface 260. Similarly, the terminal cap 200 is threaded such that the terminal cap 200 is adapted to be threaded onto the terminal cap 201, whereby the plurality of current collecting tab portions 104 and 105 fit therethrough the terminal tab openings of both terminal cap 201 and terminal cap 200, respectively. In one embodiment, the present teachings are adapted for use in a capacitor device, such as for example an ultracapacitor. In one alternate embodiment, the present teachings are adapted for use in a lithium ion battery.

Figure 2J:
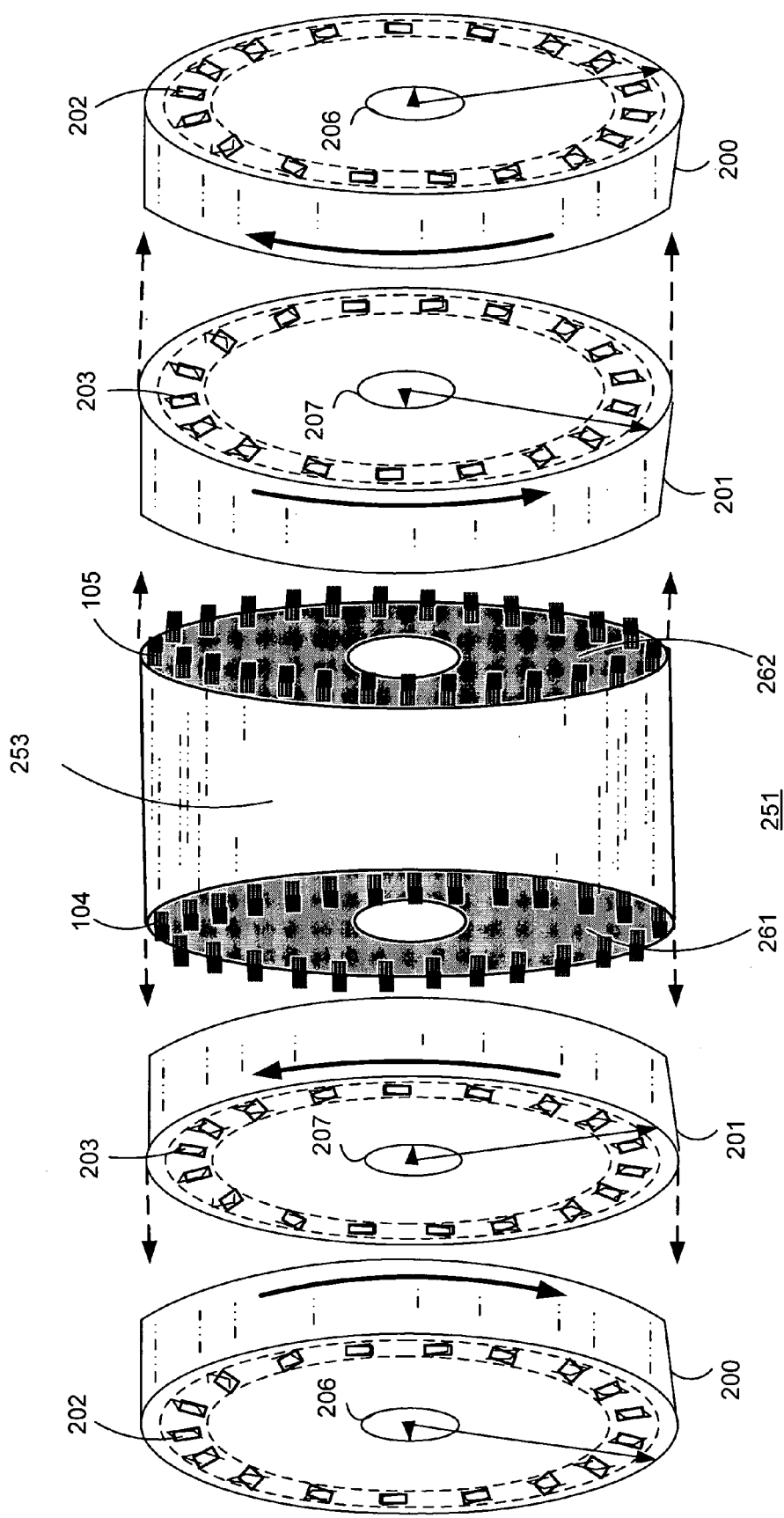
FIG. 2J illustrates an exploded view of one embodiment of the present teachings.

FIG. 2J illustrates an exploded view of one embodiment of the present teachings. This embodiment is similar to that described above, with respect to FIG. 2I, except that the first plurality of current collecting tab portions 104 protrude from an electrode termination contact interface 261 and the second plurality of current collecting tab portions 105 protrude from an electrode contact termination interface 262. The terminal caps 200 and 201 are threaded and fitted to a double-sided body 253 in a manner similar to that described above with respect to FIG. 2I. That is, the terminal caps 200 and 201 are first fitted to the electrode termination contact interface 261 and tightened, such that the first plurality of current collecting tab portions 104 first protrude through the terminal cap opening tabs 203 of the terminal cap 201, and then the first plurality of current collecting tab portions 104 secondly protrude through the terminal cap opening tabs 202 of the terminal cap 200. Similarly, the second plurality of current collecting tab portions 105 protruding from the electrode contact termination interface 262 are fitted through the terminal cap opening tabs 203 and 202 of the terminal caps 201 and 200, respectively. In one embodiment, the present teachings are adapted for use in a capacitor device, such as for example an ultracapacitor. In one alternate embodiment, the present teachings are adapted for use in a lithium ion battery.

Figure 3:
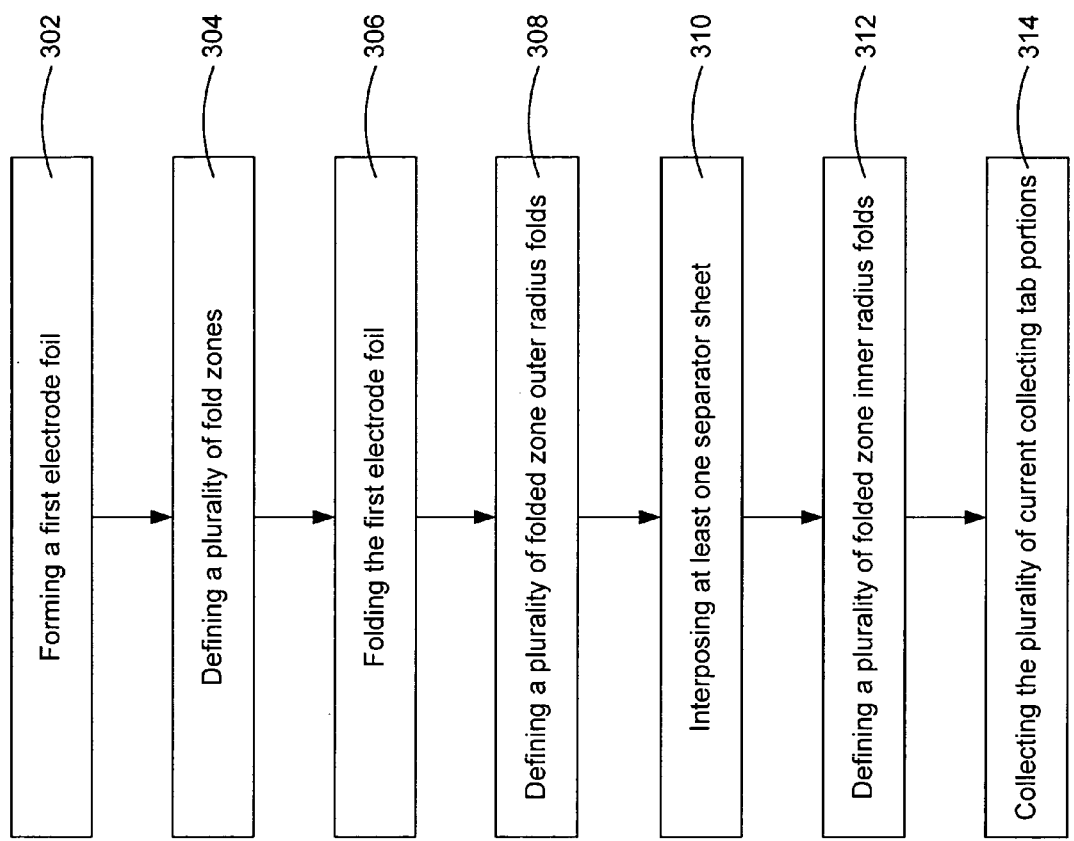
FIG. 3 illustrates a method for making an electrode termination contact interface.

FIG. 3 illustrates a method for making 300 an electrode termination contact interface. At a forming STEP 302, a first electrode foil is formed, having a plurality of active carbon deposits disposed upon predetermined portions of the first electrode foil, the electrode foil further having a plurality of current collecting tab portions disposed thereon. Next, at a defining STEP 304, a plurality of fold zones thereupon the first electrode foil are defined, wherein the fold zones are bounded by a plurality of fold lines. At a folding STEP 306, the first electrode foil is folded symmetrically about alternating fold lines. Next, at a defining STEP 308, a plurality of fold zone outer radius folds are defined, wherein the plurality of fold zone outer radius folds all lie at a fixed position relative to a winding center axis. At a next interposing STEP 310, at least one separator sheet is interposed between the plurality of fold zones, wherein the at least one separator sheet electrically isolate the plurality of fold zones. At a next defining STEP 312 a plurality of fold zone inner radius folds are defined, wherein the plurality of fold zone inner radius folds are linearly spaced toward an annular core. Lastly, at a collecting STEP 314 the plurality of current collecting tab portions for each of the plurality of fold zones is collected into a first plurality of gatherings. In one embodiment, the present teachings are adapted for use in a capacitor device, such as for example an ultracapacitor. In one alternate embodiment, the present teachings are adapted for use in a lithium ion battery.

The present teachings are focused on making the cell terminations with high quality, low variability, and tight manufacturing tolerance thereby leading to a balancer-less module. Moreover, the present teachings are on providing high integrity electrode foil to end cap terminations. In some conceptual embodiments, the disclosed techniques and methods may be readily adapted for robotized assembly.

The method described concerns a means to attach electrode foil tabs to an end cap termination that is designed to collect at least 60% of the available active area of the electrode thereby significantly reducing contact ESR and reducing part to part variability of this parameter.

This electrode termination method applies equally well to lithium metal battery construction. In fact, by extension of this assembly technique could be extended to multilayer ("MLC") such as those offered on the market by AVX and polymer multilayer ("PML") capacitors such as those manufactured by ITW Paktron.

Currently lithium-ion cells have an order of magnitude higher ESR in part due to thick electrodes and to losses in the electrode current collectors and termination means. In the lithium cell a carbon anode is needed that provides a lithium intercalation accumulator and this electrode is in effect a double layer capacitor. The teachings described herein applies equally well to fabrication of lithium-ion cell anodes (the positive electrode, conventionally manufactured out of graphite) and therefore make available the potential to lower the ESR of lithium-ion battery packs.

A more remote application, but not necessarily remote in concept, would be to apply this technique to electric machine, transformer, and dc-dc converter inductor design when ribbon conductors are used and inserted into magnetic cores leaving an open pair of leads that must be interconnected to complete the winding. In one embodiment, the technique is adapted for use on a ribbon wire or flat conductive strip windings that inherently require some means of capturing the single turn ends by pairs (or if multi-strand windings are employed) collecting several such ends and making a high integrity connection via weld, stake, or fuse. The end cap in such use would be non-conductive but with conductive lands and tabs where the winding end leads are captured and lands or frets for interconnection.

CONCLUSION

The foregoing description illustrates exemplary implementations, and novel features, of aspects of a method of making an apparatus for effectively providing a capacitor electrode termination contact interface to a terminal cap, which improves equivalent series resistance. Given the wide scope of potential applications, and the flexibility inherent in electro-mechanical design, it is impractical to list all alternative implementations of the method and apparatus. Therefore, the scope of the presented disclosure should be determined only by reference to the appended claims, and is not limited by features illustrated or described herein except insofar as such limitation is recited in an appended claim.

While the above description has pointed out novel features of the present teachings as applied to various embodiments, the skilled person will understand that various omissions, substitutions, permutations, and changes in the form and details of the methods and apparatus illustrated may be made without departing from the scope of the disclosure. These and other variations constitute embodiments of the described methods and apparatus.

Each practical and novel combination of the elements and alternatives described hereinabove, and each practical combination of equivalents to such elements, is contemplated as an embodiment of the present disclosure. Because many more element combinations are contemplated as embodiments of the disclosure than can reasonably be explicitly enumerated herein, the scope of the disclosure is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A method of making an electrode termination contact interface to a terminal cap, comprising the steps of:
    (a.) forming a first electrode foil having a plurality of active carbon deposits disposed upon predetermined portions of the first electrode foil, the electrode foil further having a plurality of current collecting tab portions disposed thereon;
    (b.) defining a plurality of fold zones thereupon the first electrode foil, wherein the fold zones are bounded by a plurality of fold lines;
    (c.) folding the first electrode foil symmetrically about alternating fold lines;
    (d.) defining a plurality of fold zone outer radius folds, wherein the plurality of fold zone outer radius folds all lie at a fixed position relative to a winding center axis;
    (e.) interposing at least one separator sheet between the plurality of fold zones, wherein the at least one separator sheet electrically isolate the plurality of fold zones;
    (f.) defining a plurality of fold zone inner radius folds, wherein the plurality of fold zone inner radius folds are linearly spaced toward an annular core, and;
    (g.) collecting the plurality of current collecting tab portions for each of the plurality of fold zones into a first plurality of gatherings.

2. The method of making an electrode termination contact interface to a terminal cap of claim 1, further comprising:
    (h.) attaching the first plurality of gatherings into a first terminal cap, wherein the first terminal cap has a plurality of terminal cap opening tabs, wherein the plurality of terminal cap opening tabs open in a first direction.

3. The method of making an electrode termination contact interface to a terminal cap of claim 1, further comprising:
    (h.) forming a second electrode foil having a plurality of active carbon deposits disposed upon predetermined portions of the second electrode foil, the second electrode foil further having a plurality of current collecting tab portions disposed thereon;
    (i.) defining a plurality of fold zones thereupon the second electrode foil, wherein the fold zones are bounded by a plurality of fold lines;
    (j.) folding the second electrode foil symmetrically about alternating fold lines;
    (k.) defining a plurality of fold zone outer radius folds, wherein the plurality of fold zone outer radius folds all lie at a fixed position relative to a winding center axis;
    (l.) interposing at least one separator sheet between each one of the plurality of fold zones, wherein the at least one separator sheet electrically isolate the plurality of fold zones;
    (m.) defining a plurality of fold zone inner radius folds, wherein the plurality of fold zone inner radius folds are linearly spaced toward an annular core, and;
    (n.) collecting the plurality of current collecting tab portions for each of the plurality of fold zones into a second plurality of gatherings.

4. The method of making an electrode termination contact interface to a terminal cap of claim 3, comprising the steps of:
    (o.) attaching the first plurality of gatherings into a first terminal cap, wherein the first terminal cap has a plurality of terminal cap opening tabs, wherein the plurality of terminal cap opening tabs open in a first direction, and;
    (p.) attaching the second plurality of gatherings into a second terminal cap, wherein the second terminal cap has a plurality of terminal cap opening tabs, wherein the plurality of terminal cap opening tabs open in a second direction, wherein the second direction is approximately opposite to the first direction.

5. The method of making an electrode termination contact interface to a terminal cap of claim 3, further comprising:
    (o.) joining the first electrode foil to the second electrode foil, comprising the steps of:
        (A.) orienting the first electrode foil such that the plurality of current collecting tab portions align along a positive vertical axis;
        (B.) orienting the second electrode foil such that the plurality of current collecting tab portions align along a negative vertical axis, and;
        (C.) fitting the first electrode foil into the second electrode foil.

6. The method of making an electrode termination contact interface to a terminal cap of claim 5, further comprising:

(p.) attaching the first plurality of gatherings into a first terminal cap, wherein the first terminal cap has a plurality of terminal cap opening tabs, wherein the plurality of terminal cap opening tabs open in a first direction for which the first plurality of gatherings fit therethrough.

7. The method of making an electrode termination contact interface to a terminal cap of claim 6, further comprising:
   (q.) attaching the second plurality of gatherings into a second terminal cap, wherein the second terminal cap has a plurality of terminal cap opening tabs, wherein the plurality of terminal cap opening tabs open in a second direction for which the second plurality of gatherings fit therethrough.

8. The method of making an electrode termination contact interface to a terminal cap of claim 3, further comprising:
   (o.) joining the first electrode foil to the second electrode foil, comprising the steps of:
      (A.) orienting the first electrode foil such that the plurality of current collecting tab portions align along a positive vertical axis;
      (B.) orienting the second electrode foil such that the plurality of current collecting tab portions align along the positive vertical axis, and;
      (C.) fitting the first electrode foil into the second electrode foil.

9. The method of making an electrode termination contact interface to a terminal cap of claim 8, further comprising:
   (p.) attaching the first plurality of gatherings into a first terminal cap, wherein the first terminal cap has a plurality of terminal cap opening tabs, wherein the plurality of terminal cap opening tabs open in a first direction for which the first plurality of gatherings fit therethrough.

10. The method of making an electrode termination contact interface to a terminal cap of claim 9, further comprising:
    (q.) attaching the second plurality of gatherings into a second terminal cap, wherein the second terminal cap has a plurality of terminal cap opening tabs, wherein the plurality of terminal cap opening tabs open in a second direction for which the second plurality of gatherings fit therethrough.

11. An electrode structure adapted for use in an energy storage device, comprising:
    (a.) a first electrode foil having a plurality of active carbon deposits disposed upon predetermined portions of the first electrode foil, the electrode foil further having a plurality of current collecting tab portions disposed thereon;
    (b.) a plurality of fold zones thereupon the first electrode foil, wherein the fold zones are bounded by a plurality of fold lines;
    (c.) a plurality of fold zone outer radius folds, wherein the plurality of fold zone outer radius folds all lie at a fixed position relative to a winding center axis;
    (d.) at least one separator sheet between the plurality of fold zones, wherein the at least one separator sheet electrically isolate the plurality of fold zones, and;
    (e.) a plurality of fold zone inner radius folds, wherein the plurality of fold zone inner radius folds are linearly spaced toward an annular core.

12. The electrode structure of claim 11, further comprising:
    (f.) a first terminal cap wherein the first terminal cap has a plurality of terminal cap opening tabs, wherein the plurality of terminal cap opening tabs open in a first direction.

13. The electrode structure of claim 11, further comprising:
    (f.) a second electrode foil having a plurality of active carbon deposits disposed upon predetermined portions of the second electrode foil, the electrode foil further having a plurality of current collecting tab portions disposed thereon;
    (g.) a plurality of fold zones thereupon the second electrode foil, wherein the fold zones are bounded by a plurality of fold lines;
    (h.) a plurality of fold zone outer radius folds, wherein the plurality of fold zone outer radius folds all lie at a fixed position relative to a winding center axis;
    (i.) at least one separator sheet between the plurality of fold zones, wherein the at least one separator sheet electrically isolate the plurality of fold zones, and;
    (j.) a plurality of fold zone inner radius folds, wherein the plurality of fold zone inner radius folds are linearly spaced toward an annular core.

14. The electrode structure of claim 13, further comprising:
    (k.) a first terminal cap wherein the first terminal cap has a plurality of terminal cap opening tabs, wherein the plurality of terminal cap opening tabs open in a first direction, and;
    (l.) a second terminal cap wherein the second terminal cap has a plurality of terminal cap opening tabs, wherein the plurality of terminal cap opening tabs open in a second direction.

15. An article of manufacture comprising an electrode termination contact interface and a terminal cap assembly, comprising:
    (a.) the electrode termination contact interface, comprising:
       (A.) a first electrode foil having a plurality of current collecting tab portions oriented in a first direction;
       (B.) a separator;
       (C.) a second electrode foil having the plurality of current collecting tab portions oriented in a second direction;
    (b.) a first terminal cap, comprising:
       (A.) a plurality of terminal cap opening tabs, wherein the plurality of terminal cap opening tabs open in a first direction;
       (B.) a threading disposed circumferentially about the first terminal cap, wherein the threading is wound in a first orientation;
    (c.) a second terminal cap, comprising:
       (A.) a plurality of terminal cap opening tabs, wherein the plurality of terminal cap opening tabs open in a second direction, and;
       (B.) a threading disposed circumferentially about the first terminal cap, wherein the threading is wound in a second orientation, wherein the second orientation is approximately opposite from the first orientation.

16. The article of manufacture of claim 15, wherein the first direction of the current collecting tab portions of the first electrode foil is approximately opposite in direction from the second direction of the current collecting tab portions of the second electrode foil.

17. The article of manufacture of claim 16, wherein the plurality of current collecting tabs is adapted to fit through the plurality of terminal cap opening tabs of the first terminal cap, and wherein the plurality of current collecting tabs is further adapted to fit through the plurality of terminal cap opening tabs of the second terminal cap.

18. The article of manufacture of claim 17, wherein the plurality of current collecting tabs of the second electrode foil are adapted to fit through a plurality of terminal cap opening tabs of a third terminal cap, and wherein the plurality of current collecting tabs of the second electrode foil are further adapted to fit through a plurality of terminal cap opening tabs of a fourth terminal cap.

19. The article of manufacture of claim 15, wherein the first direction of the current collecting tab portions of the first electrode foil is approximately identical in direction as the second direction of the current collecting tab portions of the second electrode foil.

20. The article of manufacture of claim 19, wherein the plurality of current collecting tabs is adapted to fit through the plurality of terminal cap opening tabs of the first terminal cap, and wherein the plurality of current collecting tabs is further adapted to fit through the plurality of terminal cap opening tabs of the second terminal cap.

* * * * *